US00RE49706E

(19) United States
(12) Reissued Patent
Farrell

(10) Patent Number: US RE49,706 E
(45) Date of Reissued Patent: Oct. 24, 2023

(54) ORAL EXERCISER

(71) Applicant: Christopher John Farrell, Helensvale (AU)

(72) Inventor: Christopher John Farrell, Helensvale (AU)

(21) Appl. No.: 29/758,472

(22) Filed: Nov. 16, 2020

Related U.S. Patent Documents

Reissue of:
(64) Patent No.: Des. 889,665
Issued: Jul. 7, 2020
Appl. No.: 29/670,684
Filed: Nov. 19, 2018

(30) Foreign Application Priority Data

May 18, 2018 (AU) ..... 201812943

(51) LOC (14) Cl. ..... 24-02
(52) U.S. Cl.
USPC ..... D24/180; D24/176
(58) Field of Classification Search
USPC ..... D24/176, 180, 181, 182, 194; D29/108; D21/662
CPC ..... A61H 2001/0207; A61F 5/56; A61F 2005/0207; A63B 71/085; A63B 2071/086;

(Continued)

(56) References Cited

U.S. PATENT DOCUMENTS 3,118,667 A * 1/1964 Barons ..... A63B 23/032 482/11
3,744,485 A * 7/1973 Worthy ..... A63B 23/032 601/23

(Continued)

OTHER PUBLICATIONS

Oral Motor Exerciser, [site visited Mar. 4, 2020], Available from internet. URL: https://getabilex.com/products/abilex-oral-motor-exerciser?variant=15877979308126 (Year: 2018).*

(Continued)

*Primary Examiner* — Philip S Hyder
(74) *Attorney, Agent, or Firm* — Saidman DesignLaw Group, LLC

(57) CLAIM

The ornamental design for an oral exerciser, as shown and described.

DESCRIPTION

FIG. 1 is a top perspective view of an oral exerciser showing my new design;
FIG. 2 is a bottom perspective view thereof;
FIG. 3 is a top view thereof;
FIG. 4 is a bottom view thereof;
FIG. 5 is a left side view thereof;
FIG. 6 is a front view thereof;[and, ]
FIG. 7 is a rear view thereof[.];
*FIG. 8 is a top perspective view of a second embodiment thereof;*
*FIG. 9 is a bottom perspective view thereof;*
*FIG. 10 is a top view thereof;*
*FIG. 11 is a bottom view thereof;*
*FIG. 12 is a left side view thereof;*
*FIG. 13 is a front view thereof; and,*
*FIG. 14 is a rear view thereof.*
*In FIGS. 8-14, the broken lines illustrate structure or features which form no part of the claimed design.*

1 Claim, 8 Drawing Sheets

Figure 1:
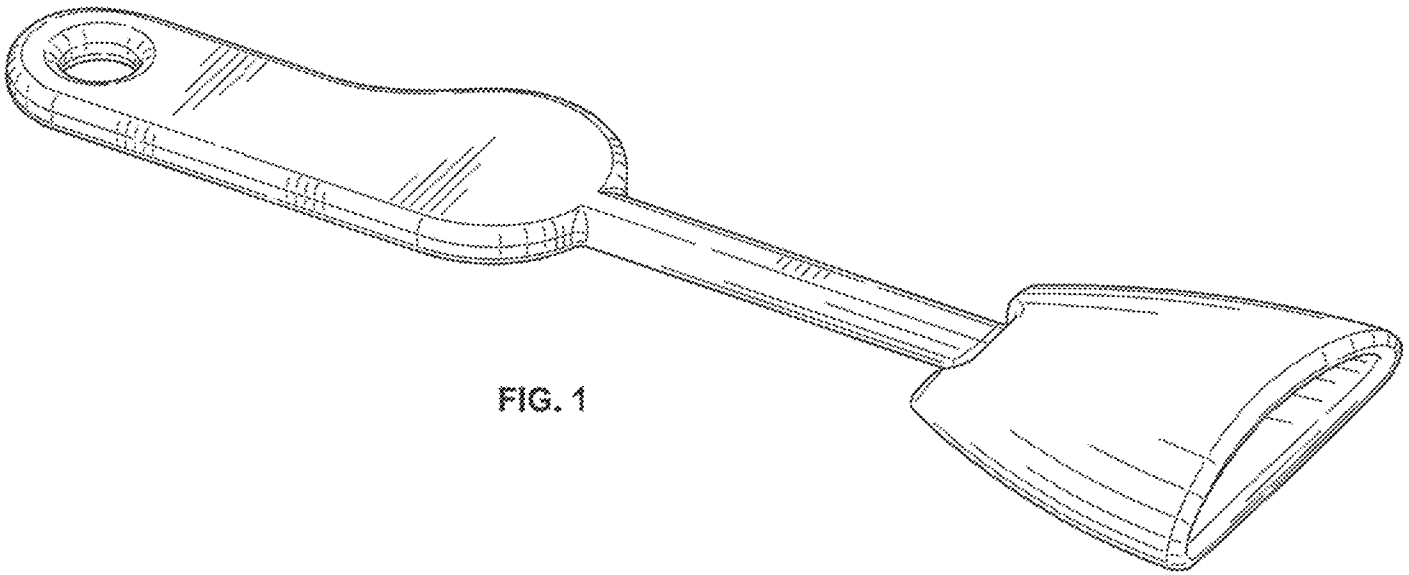
Figure 2:
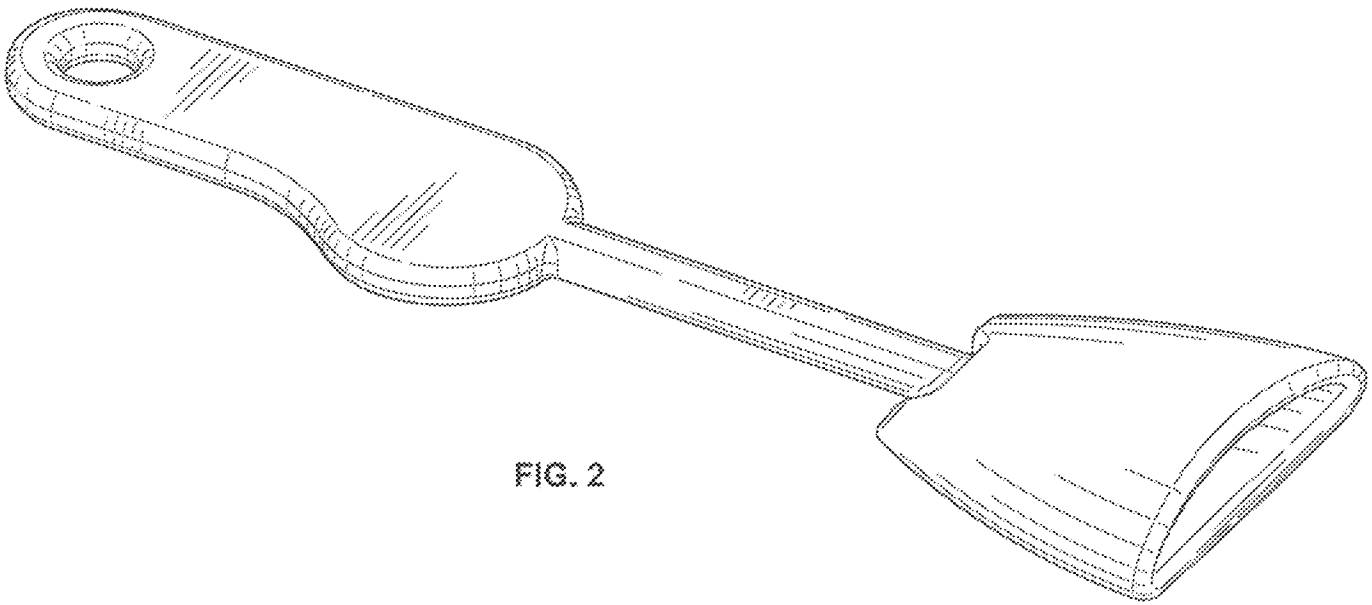
Figure 3:
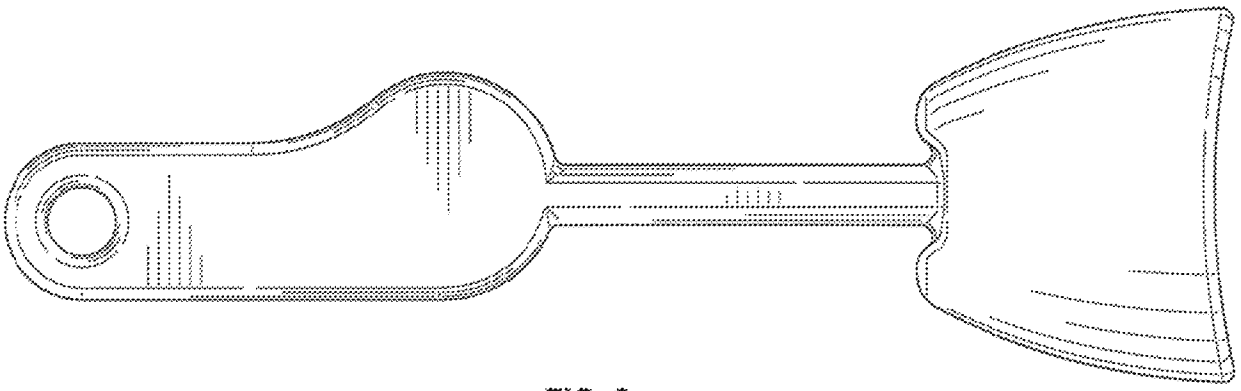
Figure 4:
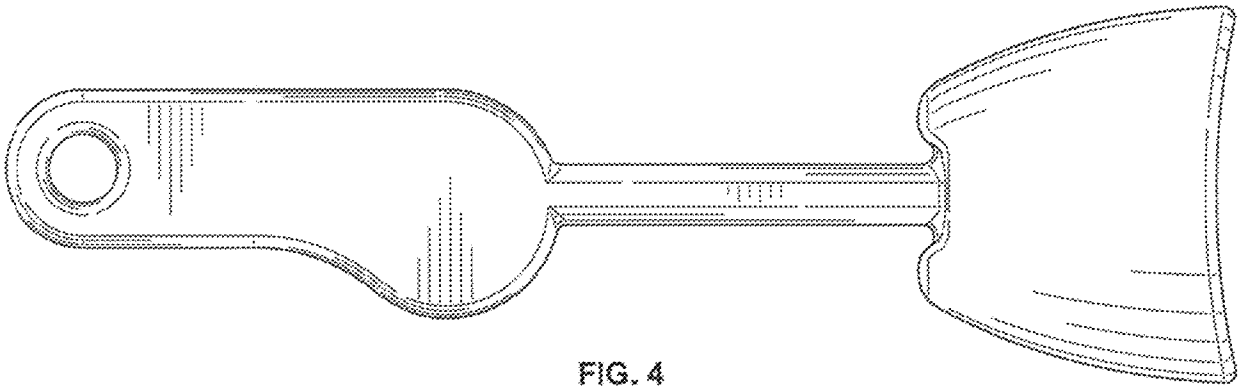
Figure 5:
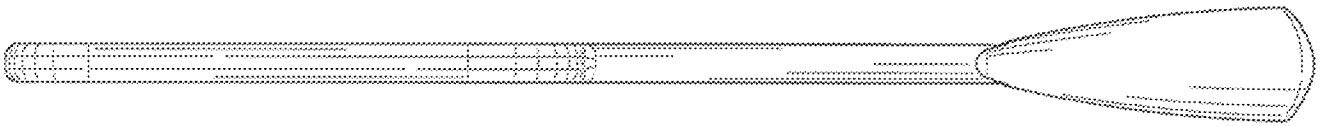
Figure 7:
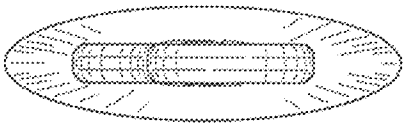
Figure 6:
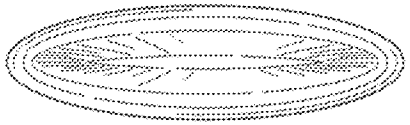

Matter enclosed in heavy brackets [ ] appears in the original patent but forms no part of this reissue; matter printed in italics indicates the additions made by reissue.

(new)

(58) Field of Classification Search
CPC ..... A63B 71/0054; A61C 7/08; A61C 7/36; A61C 7/143; A61C 7/148; A61C 19/05
See application file for complete search history.

(56) References Cited

U.S. PATENT DOCUMENTS

| | | | | | |
|---|---|---|---|---|---|
| 4,966,580 | A * | 10/1990 | Turner | A61J 15/0011 | 215/11.4 |
| 5,213,553 | A * | 5/1993 | Light | A61F 5/58 | 434/185 |
| D374,932 | S * | 10/1996 | Engelman | A61B 5/224 | D24/176 |
| D381,716 | S * | 7/1997 | Nava, Jr. | D21/680 | |
| 6,524,225 | B1 * | 2/2003 | Arias | A63B 23/032 | 482/11 |
| 6,761,699 | B2 * | 7/2004 | Chahine | A61H 39/00 | 601/134 |
| D542,408 | S * | 5/2007 | Oldenburg | A61J 17/02 | D24/110.5 |
| 7,238,145 | B2 * | 7/2007 | Robbins | A63B 21/0004 | 482/11 |
| D625,413 | S * | 10/2010 | Bennett | A61J 15/0011 | D24/136 |
| D650,083 | S * | 12/2011 | Sharp | A63B 23/032 | D24/194 |
| 8,261,748 | B1 * | 9/2012 | Goldberg | A61F 5/566 | 128/200.26 |
| D682,436 | S * | 5/2013 | Lowsky | D24/193 | |
| 9,149,681 | B2 * | 10/2015 | Smead | A63B 21/02 | |
| D820,458 | S * | 6/2018 | Way | D24/181 | |
| 10,149,782 | B2 * | 12/2018 | Chen | A61M 16/0493 | |
| D838,368 | S * | 1/2019 | Rifani | D24/133 | |
| D871,571 | S * | 12/2019 | Chen | A61F 5/566 | D24/110.5 |
| 2004/0000054 | A1 * | 1/2004 | Sommer | A47G 21/02 | 30/123 |
| 2009/0005810 | A1 * | 1/2009 | Bonazza | A61J 17/02 | 606/235 |
| 2010/0121224 | A1 * | 5/2010 | Toyota | A61B 5/038 | 600/590 |
| 2010/0222706 | A1 * | 9/2010 | Miyahara | A61B 5/038 | 600/590 |
| 2013/0190656 | A1 * | 7/2013 | Toyota | A61B 5/224 | 600/590 |
| 2013/0296751 | A1 * | 11/2013 | Martin | A61H 21/00 | 601/148 |
| 2014/0066258 | A1 * | 3/2014 | Smead | A63B 21/02 | 482/11 |

OTHER PUBLICATIONS

Mouth Exerciser, [site visited Mar. 2, 2020]. Available from Internet. URL: https://www.racergadgets.co.za/products/1545712 (Year: 2020).*

* cited by examiner

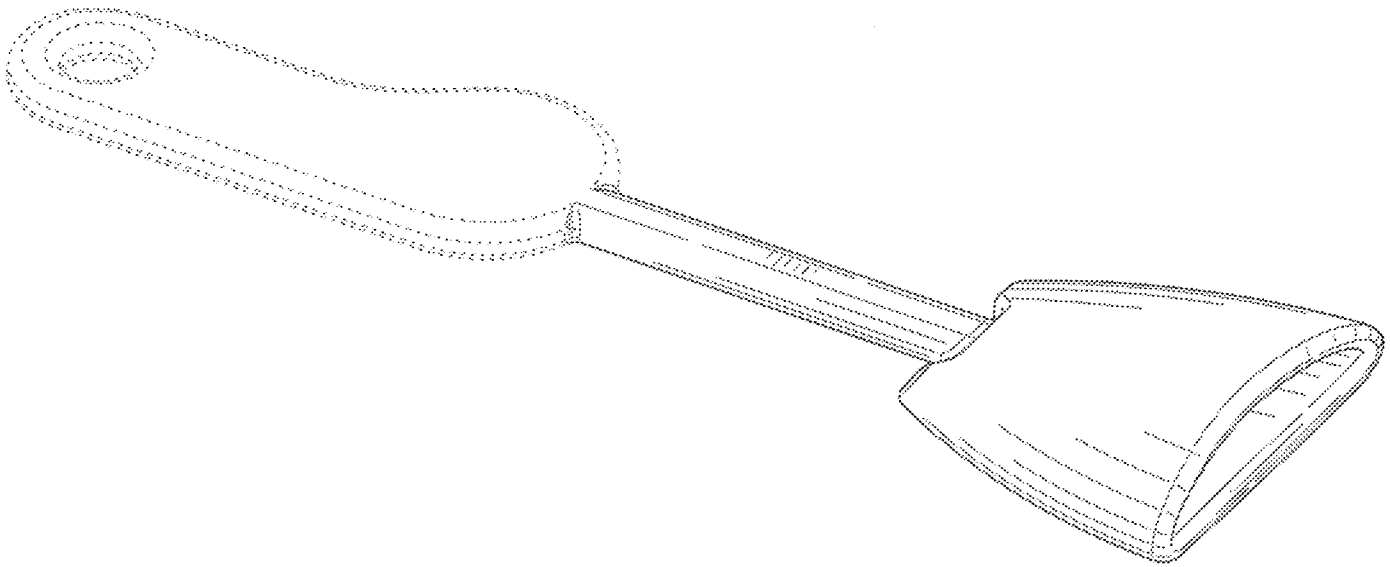
FIG. 8
*(new)*

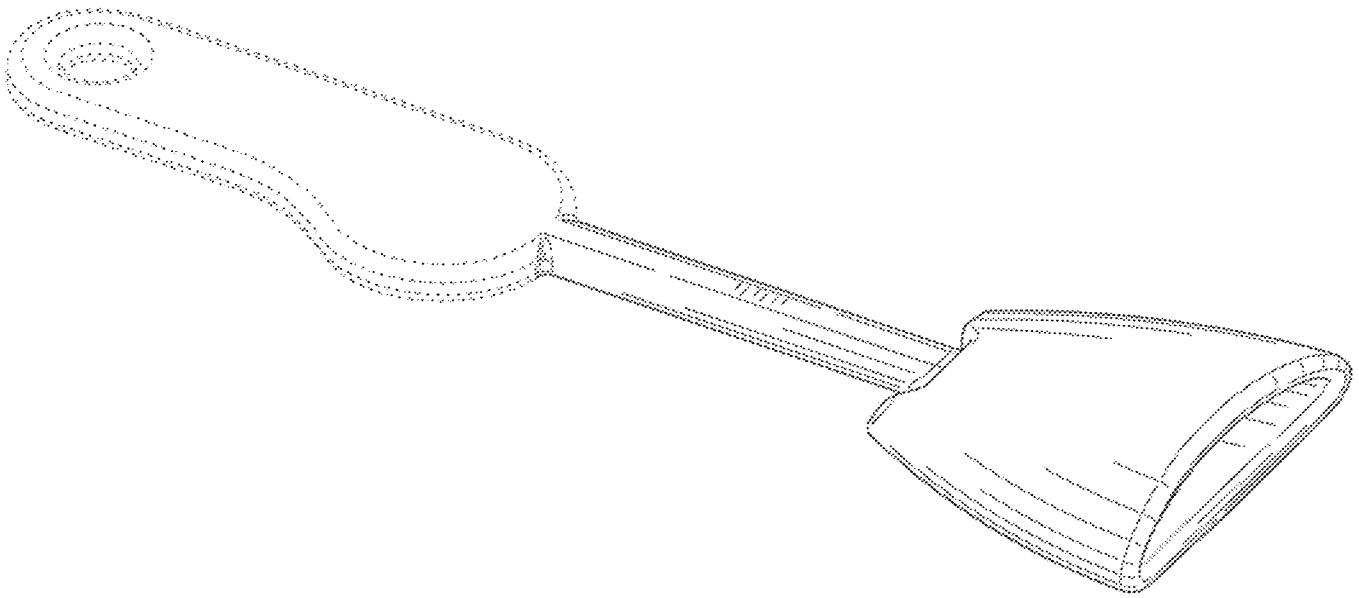
FIG. 9
*(new)*

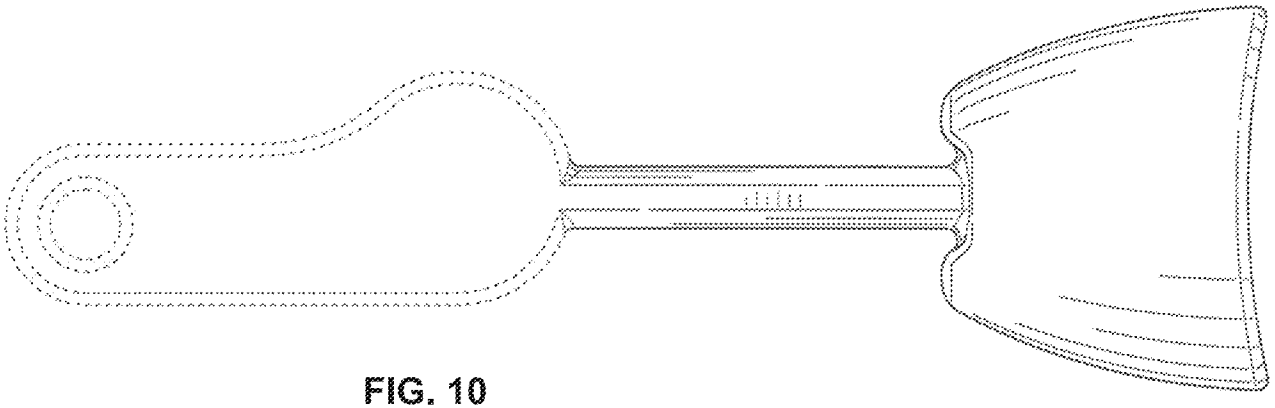
FIG. 10
*(new)*
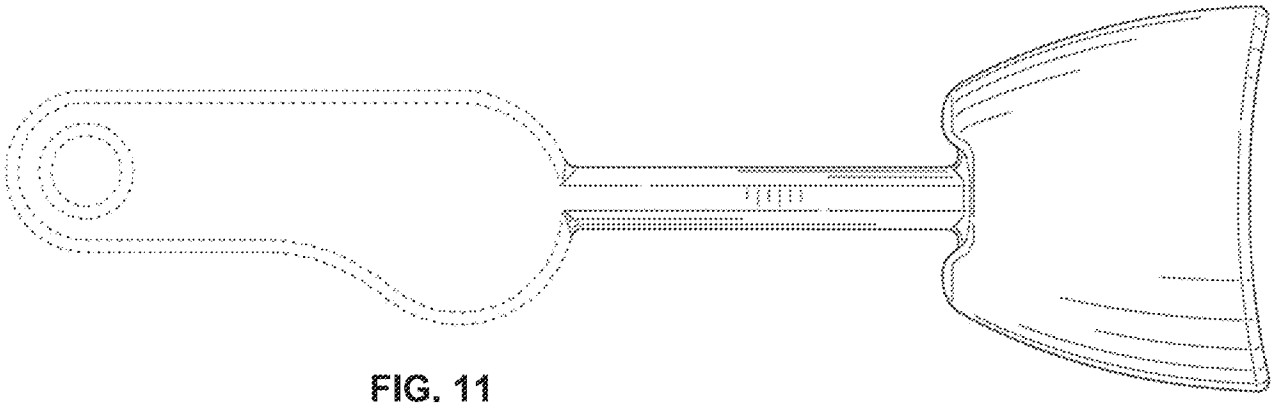
FIG. 11
*(new)*

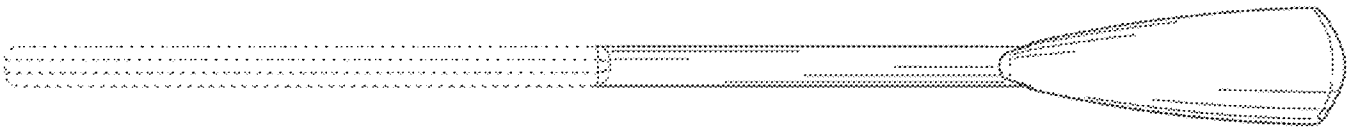
FIG. 12
*(new)*
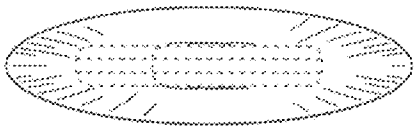
FIG. 14
*(new)*
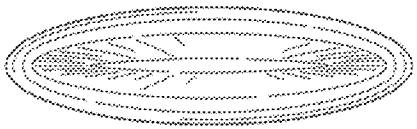
FIG. 13
*(new)*